United States Patent
Cai et al.

(10) Patent No.: US 9,632,917 B2
(45) Date of Patent: Apr. 25, 2017

(54) SOFTWARE TESTING

(71) Applicant: INTERNATIONAL BUSINESS MACHINES CORPORATION, Armonk, NY (US)

(72) Inventors: Duan Cai, Beijing (CN); Liu Hao, Beijing (CN); Qiang Li, Beijing (CN); Lan Qian Peng, Beijing (CN); Yan Yan, Beijing (CN); Chuan Jie Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 14/599,826

(22) Filed: Jan. 19, 2015

(65) Prior Publication Data
US 2015/0234733 A1 Aug. 20, 2015

(30) Foreign Application Priority Data
Feb. 18, 2014 (CN) .......................... 2014 1 0054004

(51) Int. Cl.
G06F 11/00 (2006.01)
G06F 11/36 (2006.01)
G06F 11/34 (2006.01)

(52) U.S. Cl.
CPC ...... G06F 11/3684 (2013.01); G06F 11/3419 (2013.01)

(58) Field of Classification Search
CPC ............ G06F 11/3419; G06F 11/3684; G06F 11/3672; G06F 11/3688
See application file for complete search history.

(56) References Cited

U.S. PATENT DOCUMENTS

| 5,805,795 A * | 9/1998 | Whitten | G06F 11/3672 714/32 |
| 6,507,842 B1 * | 1/2003 | Grey | G06F 11/3672 |
| 6,609,216 B1 * | 8/2003 | Almy | G06F 11/3419 714/25 |

(Continued)

FOREIGN PATENT DOCUMENTS

JP  4874277  2/2012

OTHER PUBLICATIONS

Definition of Divide, Merriam-Webster, http://www.merriam-webster.com/dictionary/divide.*

(Continued)

Primary Examiner — Marc Duncan
(74) Attorney, Agent, or Firm — Law Office of Jim Boice

(57) ABSTRACT

Software testing uses a plurality of test cases, where each of the test cases includes a plurality of test tasks. The test cases are analyzed to obtain at least one reusable test task sequence between at least two test cases. The reusable test task sequence includes at least one identical test task. The test cases are divided into at least one test case group according to the reusable test task sequence, where the test cases in each of the test case groups has at least one reusable test task sequence. For each of the test cases of the at least one test case group, an execution script of each test case is generated by using an execution script of a reusable test task, where the execution script of each test case includes at least one of backup or restore for the reusable test task sequence.

15 Claims, 3 Drawing Sheets

(56) References Cited

U.S. PATENT DOCUMENTS

| | | | |
|---|---|---|---|
| 7,673,288 B1* | 3/2010 | Stroomer | G06F 11/3692 703/14 |
| 7,873,944 B2 | 1/2011 | Bangel et al. | |
| 8,347,147 B2 | 1/2013 | Adiyapatham et al. | |
| 8,434,058 B1 | 4/2013 | Hudgons et al. | |
| 2006/0253742 A1* | 11/2006 | Elenburg | G06F 11/3414 714/38.14 |
| 2007/0094541 A1 | 4/2007 | Kang | |
| 2010/0114939 A1* | 5/2010 | Schulman | G06F 11/3672 707/769 |
| 2011/0145643 A1* | 6/2011 | Kumar | G06F 11/263 714/33 |
| 2011/0214058 A1* | 9/2011 | Duffie | G06F 9/4443 715/704 |
| 2011/0283148 A1 | 11/2011 | Rossi | |
| 2011/0296384 A1* | 12/2011 | Pasternak | G06F 11/3688 717/124 |
| 2012/0260129 A1* | 10/2012 | Wilson | G06F 11/3688 714/32 |
| 2013/0041900 A1* | 2/2013 | McCoy | G06F 17/30286 707/737 |
| 2014/0181793 A1* | 6/2014 | Kaliappan | G06F 11/3684 717/124 |
| 2014/0337673 A1* | 11/2014 | Busi | G06F 11/3684 714/38.1 |
| 2016/0196021 A1* | 7/2016 | Rahulkrishna | G06F 3/04842 715/760 |

OTHER PUBLICATIONS

Gordon Fraser et al, "Redundancy Based Test-Suite Reduction," Fundamental Approaches to Software Engineering, Lecture Notes in Computer Science, vol. 4422, 2007, pp. 291-305, Springer Berlin Heidelberg.

Bojan Cukic, "Accelerated Testing for Software Reliability Assessment," Department of Computer Science and Electrical Engineering West Virginia University, Morgantown, West Virginia, Jun. 8, 1998, pp. 1-4.

IBM "Dependency based test case organization for cost saving execution," IP.com, IPCOM000160942, Dec. 4, 2007, pp. 1-2.

Anonymous, "A system and method of graphic test case redundancy analysis and auto-correction," IP.com, IPCOM000221127, Aug. 30, 2012, pp. 1-6.

* cited by examiner

US 9,632,917 B2

SOFTWARE TESTING

BACKGROUND

The present invention relates to data processing, and more specifically, to a method and system for software testing.

With constantly enlarged software scale and ever increasing software complexity, the number of test cases for a software product keeps growing. In execution of conventional testing, all the test tasks of each test case will be executed in order one by one, so as to complete the execution of all the test cases. Since execution of test cases is usually time-consuming, as number of test cases increases, efficiency of software testing will decrease accordingly.

SUMMARY

In an embodiment of the present invention, a method and/or computer program product performs software testing by using a plurality of test cases, where each of the test cases includes a plurality of test tasks. The test cases are analyzed to obtain at least one reusable test task sequence between at least two test cases. The reusable test task sequence includes at least one identical test task. The test cases are divided into at least one test case group according to the reusable test task sequence, where the test cases in each of the test case groups has at least one reusable test task sequence. For each of the test cases of the at least one test case group, an execution script of each test case is generated by using an execution script of a reusable test task, where the execution script of each test case includes at least one of backup or restore for the reusable test task sequence.

In an embodiment of the present invention, a system performs software testing by using a plurality of test cases, where each of the test cases includes a plurality of test tasks. An analyzing hardware module is configured to analyze the plurality of test cases to obtain at least one reusable test task sequence between at least two test cases, where the reusable test task sequence includes at least one identical test task. A dividing hardware module is configured to divide the plurality of test cases into at least one test case group according to the reusable test task sequence, where the plurality of test cases in each of the test case groups has at least one reusable test task sequence. A generating hardware module is configured to generate, for each of the plurality of test cases of the at least one test case group, an execution script of each test case by using an execution script of a reusable test task, where the execution script of each test case includes at least one of backup or restore for the reusable test task sequence.

BRIEF DESCRIPTION OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Figure 1:
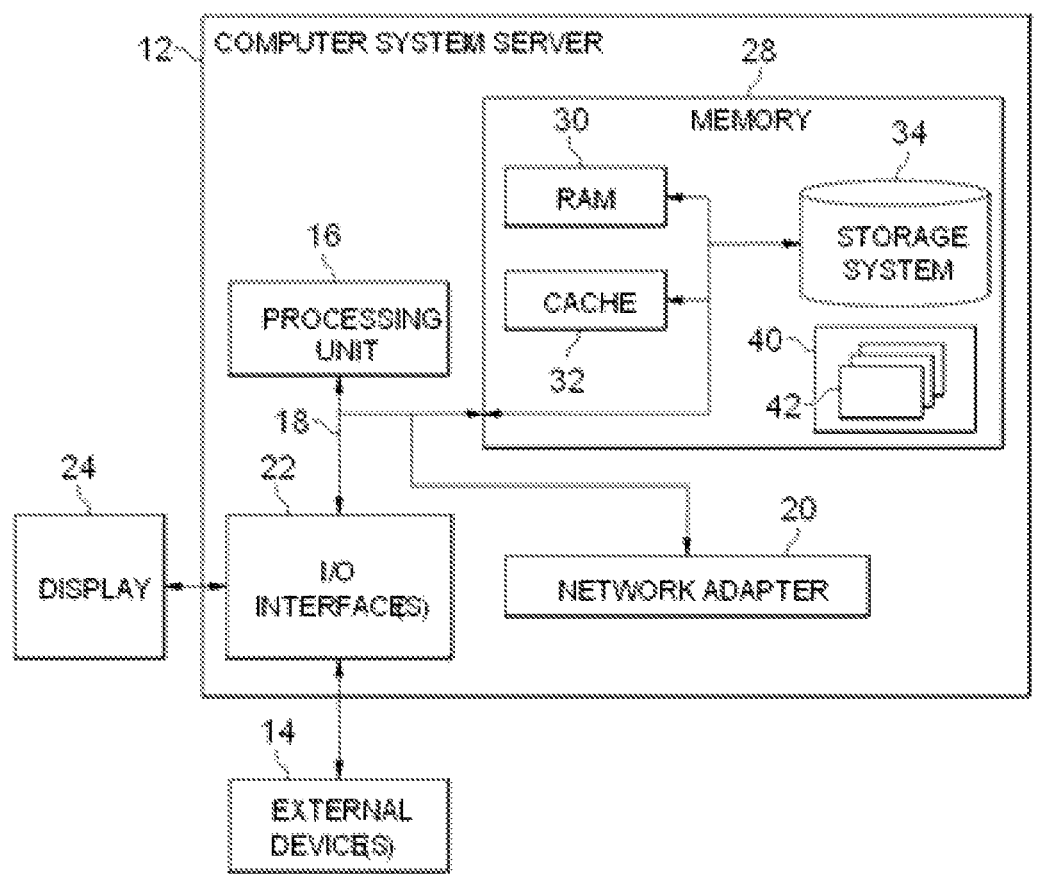
FIG. 1 shows a block diagram of an exemplary computer system/server 12 which is applicable to implement the embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 shows a block diagram of an exemplary computer system/server 12 which is applicable to implement the embodiments of the present invention. Computer system/server 12 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In addition to conventional computer system/server 12 shown in FIG. 1, a mobile electric device may also be included for achieving embodiment of the invention, including but not limited to, mobile telephones, PDAs, tablet computers and others. Typically, a mobile electric device has an input device, including but not limited to, touch input devices, such as, touch screens, touch panels and others.

Figure 2:
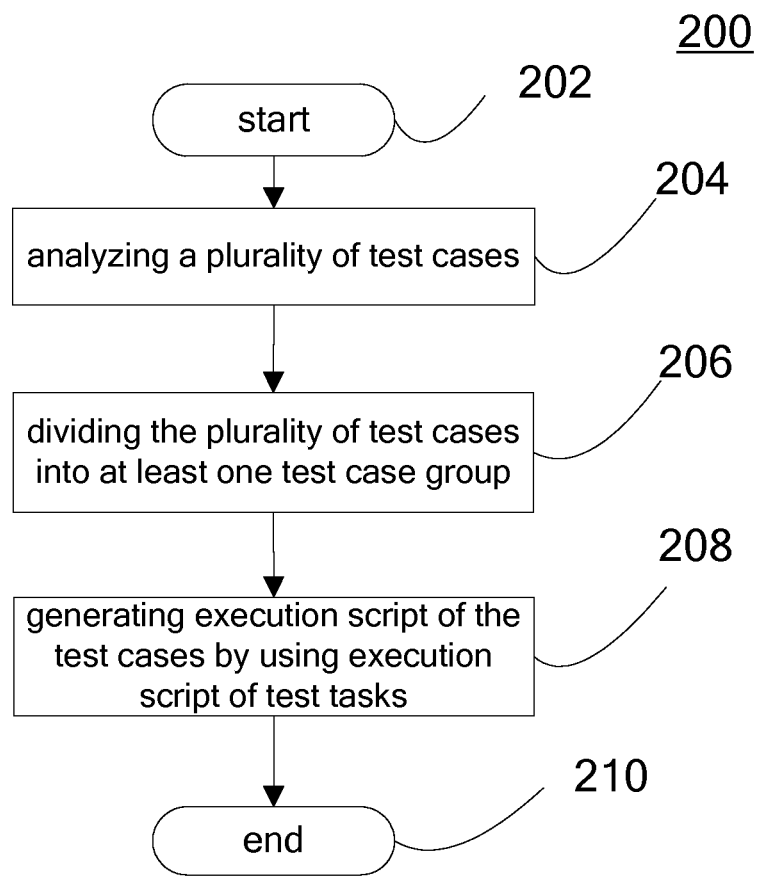
FIG. 2 shows a flowchart of a method 200 for performing software testing by using a plurality of test cases according to one embodiment of the present invention.

With reference now to FIG. 2, a flowchart of a method 200 for performing software testing by using a plurality of test cases according to one embodiment of the present invention is shown.

According to one embodiment of the present invention, the method 200 for performing software testing by using a plurality of test cases starts from step 202. According to one embodiment of the present invention, each of the plurality of test cases is decomposed to include a plurality of test tasks. The test tasks are test steps making up a test case. Each test task has a unique identifier, a corresponding execution script and corresponding execution time. For ease of description, each test task may be represented by structure of test task metadata given in the following Table 1.

TABLE 1

Metadata of Test Tasks

| Test Task ID | Execution Script | Execution Time (min) |
|---|---|---|
| A1 | Script (A1) | 2 |
| ... | ... | ... |
| A6 | Script (A6) | 10 |
| ... | ... | ... |
| B5 | Script (B5) | 9 |
| ... | ... | ... |
| C1 | Script (C1) | 12 |
| ... | ... | ... |
| D1 | Script (D1) | 7 |
| ... | ... | ... |

According to one embodiment of the present invention, each of the plurality of test cases may be decomposed to include a plurality of test tasks. To facilitate subsequent description, an example of a plurality of decomposed test cases represented by test tasks is exemplarily provided in the following Table 2.

TABLE 2

Test Case Represented by Test Tasks

| Test Case | Test Case Represented by Test Tasks |
|---|---|
| TC1 | A6, B5, C1, D1, C5, D5 |
| TC2 | A6, B5, C1, D1, C1, G1 |
| TC3 | A6, B5, C3, G2 |
| TC4 | A1, B1, C2, C5, G5 |
| TC5 | A6, B5, C1, D1, C3, G2 |

It should be appreciated that, Table 1 merely exemplarily provides an example of metadata of test tasks. Those skilled in the art may represent metadata of test tasks by any other suitable structure. Table 2 also merely exemplarily provides an example of a plurality of decomposed test cases represented by test tasks. Table 1 and Table 2 are both merely for the purpose of facilitating description, which should not be construed as limiting protection scope of the present invention.

Next, the method 200 for performing software testing by using a plurality of test cases according to one embodiment of the present invention proceeds to step 204, wherein, analyzing a plurality of test cases is accomplished, so as to obtain at least one reusable test task sequence between at least two test cases. According to one embodiment of the present invention, the reusable test task sequence includes at least one identical test task, and result obtained from its execution can be reused, so that repeated execution of identical test tasks can be avoided, which, in general, can significantly reduce execution time of test cases, thereby improving efficiency of software testing.

Taking the plurality of test cases provided in Table 2 for example, at least one reusable test task sequence between at least two test cases can be obtained through analysis. Reusable test task sequences between TC1 and respective test cases obtained by taking TC1 as an entry are as follows:

TC2: A6, B5, C1, D1

TC3: A6, B5

TC4: NULL

TC5: A6, B5, C1, D1

Further, according to one embodiment of the present invention, at least one reusable test task sequence among a plurality of test cases may be obtained through further analysis. For example, result of the analysis may be:

The reusable test task sequence among TC1, TC2 and TC5 is:

A6, B5, C1, D1

The reusable test task sequence among TC1, TC2, TC3 and TC5 is:

A6, B5

The plurality of test cases may be analyzed by any manner in the art, so as to obtain at least one reusable test task sequence between at least two test cases, details of which will not be repeated here for brevity.

Next, the method 200 for performing software testing by using a plurality of test cases according to one embodiment of the present invention proceeds to step 206, wherein, dividing the plurality of test cases into at least one test case group according to the reusable test task sequence, wherein a plurality of test cases in each of the test case groups has at least one reusable test task sequence. According to one embodiment of the present invention, the plurality of the test cases may be divided according to number of test cases having reusable test task sequence in descending order. On the contrary, the plurality of test cases may also be divided according to number of test cases having reusable test task sequence in ascending order. It is also possible to first put a test case having the longest reusable test task sequence into a test case group, then put a test case having the second longest reusable test task sequence into a test case group, and so on. Alternatively, according to one embodiment of the present invention, first, a test case having the shortest reusable test task sequence is put into a test case group, then a test case having the second shortest reusable test task sequence is put into a test case group, and so on. The plurality of test cases can be divided into at least one test case group according to the reusable test task sequence in any other possible manners, which will not be illustrated herein one by one. Next, the description will be given by taking dividing a plurality of test cases according to number of test cases having reusable test task sequence in descending order as an example, as such, at least one test case group may be formed as follows:

{TC1, TC2, TC3, TC5}=>{A6, B5} // number of test cases is 4 {TC1, TC2, TC5}=>{A6, B5, C1, D1} /// number of test cases is 3

Further, the formed at least one test case group may be further analyzed to form at least one test case group as follows:

{{TC1, TC2, TC5}, TC3}=>{{A6, B5}, C1, D1}

The above finally formed at least one test case group indicates that:

There is a reusable test task sequence A6, B5 among test cases TC1, TC2 TC5 and TC3, and there is a reusable test task sequence A6, B5, C1, D1 among test cases TC1, TC2 and TC5. For ease of description, the reusable test task sequences are represented in the following manner, respectively:

{A6, B5}=>S1
{A6, B5, C1, D1}=>S2
Wherein S2={S1, C1, D1}.

In this way, the plurality of test cases can finally be represented by the manner of Table 3.

TABLE 3

Test Case Represented by Reusable Test Task Sequence

| Test Case | Test Cases Represented by Reusable Test Task Sequence |
|---|---|
| TC1 | S2(S1, C1, D1), C5, D5 |
| TC2 | S2(S1, C1, D1), C1, G1 |
| TC3 | S1, C3, G2 |
| TC4 | A1, B1, C2, C5, G5 |
| TC5 | S2(S1, C1, D1), C3, G2 |

Next, the method 200 for performing software testing by using a plurality of test cases according to one embodiment of the present invention proceeds to step 208, wherein, generating, for each of the plurality of test cases in the at least one test case group, an execution script of that test case by using an execution script of the test task, the execution script of that test case including at least one of backup or restore for the reusable test task sequence. According to one embodiment of the present invention, depending on the formed test case group, execution scripts of corresponding test cases that may be generated by using execution scripts of the test tasks will be described hereinafter, respectively.

Case One: assume the formed test case group is:
{TC1, TC2, TC3, TC5}=>{A6, B5}
First, generate an execution script of the reusable test task sequence:
Script(S1)=Script(A6)+Script(B5)
Then, generate execution script of the corresponding test cases:
TC1: Script(S1)+Backup{S1}+Script(C1)+Script(D1)+Script(C5)+Script(D5)
TC2: Restore{S1}+Script(C1)+Script(D1)+Script(C1)+Script(G1)
TC3: Restore{S1}+Script(C3)+Script(G2)
TC5: Restore{S1}+Script(C1)+Script(D1)+Script(C3)+Script(G2)

Case Two: assume the formed test case group is:
{TC1, TC2, TC5}=>{A6, B5, C1, D1}
First, generate execution script of the reusable test task sequence:
Script(S2)=Script(A6)+Script(B5)+Script(C1)+Script(D1)
Then, generate execution script of the corresponding test cases:
TC1: Script(S2)+Backup{S2}+Script(C5)+Script(D5)
TC2: Restore{S2}+Script(C1)+Script(G1)
TC5: Restore{S2}+Script(C3)+Script(G2)

Case Three: assume the formed test case group is:
{{TC1, TC2, TC5}, TC3}=>{{A6, B5}, C1, D1}
First, generate execution script of the reusable test task sequences:
Script(S1)=Script(A6)+Script(B5)
Script(S2)=Script(S1)+Script(C1)+Script(D1)

Further, generate execution script of the corresponding test cases:
TC1: Script(S1)+Backup{S1}+Script(C1)+Script(D1)+Backup{S2}+Script(C5)+Script(D5)
TC2: Restore{S2}+Script(C1)+Script(G1)
TC3: Restore{S1}+Script(C3)+Script(G2)
TC5: Restore{S2}+Script(C3)+Script(G2)

It can be seen that, depending on the finally formed test case group, the generated execution script of the test case may vary; however, the execution script of the test case includes at least one of backup (Backup { } in the above script) or restore (Restore { } in the above script) for the reusable test task sequence. The above merely exemplarily describes the generated execution script of the test case, and those skilled in the art can generate the execution script of the test case by using any other possible manner in the art. Exemplary description in the invention should not be construed as a limitation to the protection scope of the invention.

According to one embodiment of the present invention, the method 200 for performing software testing by using a plurality of test cases further comprises: executing the test cases; in response to the backup for the reusable test task sequence, i.e., in response to Backup { } in script of the test cases is to be executed, backing up execution environment corresponding to the reusable test task sequence. Taking the execution script of test case TC1 in the above given case one for example, when executing the test case, in response to backup for the reusable test task sequence, i.e., in response to Backup { } in script of the test case is to be executed, backing up execution environment corresponding to the reusable test task sequence, the execution environment including environment variables, intermediate results of execution, etc. The backup may be performed by taking a snapshot of the execution environment corresponding to the reusable test task sequence, or may be performed by using any other manners in the art. Further, according to one embodiment of the present invention, in response to the backup for the reusable test task sequence, i.e., in response to Backup { } in script of the test case is to be executed, it is judged whether the backup can accelerate software testing or not; the execution environment corresponding to the reusable test task sequence is backed up if result of the judgment is yes. According to one embodiment of the present invention, the judgment may be made according to time for performing the backup and restore and execution time of the reusable test task sequence. If the time for backup is less than the execution time of the reusable test task sequence, then execution environment corresponding to the reusable test task sequence is backed up. If the time for backup is larger than the execution time of the reusable test task sequence, then execution environment corresponding to the reusable test task sequence will not be backed up.

In the following, description will be made by taking case one for example, in which:
TC1: Script(S1)+Backup{S1}+Script(C1)+Script(D1)+Script(C5)+Script(D5)

In response to the backup for the reusable test task sequence (Backup {S1}), according to the time for backup and restore (here, it is a sum t1 of the time for taking a snapshot of execution environment of the reusable test task sequence S1 and the time for restoring execution environment of S1 based on the backup) and the execution time of the reusable test task sequence (here, the execution time is the time for executing S1, i.e., a sum t2 of the execution time of A6 and B5, which is 19 minutes as known from Table 1), if t1<t2, then backup will be performed on the execution environment corresponding to the reusable test task sequence.

In the following, description will be further made by taking case three for example, in which:

TC1: Script(S1)+Backup{S1}+Script(C1)+Script(D1)+Backup{S2}+Script(C5)+Script(D5)

In addition to performing judgment in response to Backup {S1}, further, the judgment is made in response to the backup for the reusable test task sequence (Backup {S2}), according to the time for backup and restore (here, it is a sum t3 of the time for taking a snapshot of the execution environment of the reusable test task sequence S2 and the time for restoring the execution environment of S2 based on the backup) and the execution time of the reusable test task sequence (here, the execution time is a sum t4 of the time for executing C1 and D1), if t3<t4, then backup will be performed on the execution environment corresponding to the reusable test task sequence.

According to one embodiment of the present invention, in response to the restore for the reusable test task sequence, i.e., in response to Restore { } in script of the test case is to be executed, the execution environment corresponding to the reusable test task sequence is restored based on the backup. In general, since the time required for restoring the execution environment corresponding to the reusable test task sequence based on the backup is usually far less than the time for repeatedly executing the reusable test task sequence, execution time of the test cases can be significantly reduced, thereby improving efficiency of software testing.

Figure 3:
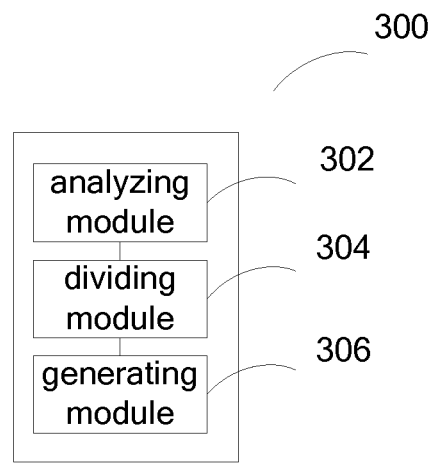
FIG. 3 shows a block diagram of a system 300 for performing software testing by using a plurality of test cases according to one embodiment of the present invention.

With reference now to FIG. 3, a block diagram of a system 300 for performing software testing by using a plurality of test cases according to one embodiment of the present invention is shown. According to one embodiment of the present invention, each test case includes a plurality of test tasks. The system 300 comprises multiple hardware devices, also referred to as hardware modules (or simply "modules", which are defined herein as hardware devices/modules), including: an analyzing module 302 configured to analyze the plurality of test cases to obtain at least one reusable test task sequence between at least two test cases, the reusable test task sequence including at least one identical test task; a dividing module 304 configured to divide the plurality of test cases into at least one test case group according to the reusable test task sequence, wherein a plurality of test cases in each of the test case groups has at least one reusable test task sequence; wherein, each of the test tasks has an execution script, the system 300 further comprising: a generating module 306 configured to generate, for each of the plurality of test cases of the at least one test case group, an execution script of that test case by using an execution script of the test task, the execution script of that test case including at least one of backup or restore for the reusable test task sequence.

According to one embodiment of the present invention, the system 300 for performing software testing by using a plurality of test cases further comprises: an executing module configured to execute the test cases; a backup module configured to backup, in response to the backup for the reusable test task sequence, execution environment corresponding to the reusable test task sequence. According to one embodiment of the present invention, the backup module is further configured to: judge, in response to the backup for the reusable test task sequence, whether the backup can accelerate software testing or not; and backup the execution environment corresponding to the reusable test task sequence if result of the judgment is yes. According to one embodiment of the present invention, the judgment is made according to time for performing the backup and restore and execution time of the reusable test task sequence. According to one embodiment of the present invention, the system 300 for performing software testing by using a plurality of test cases further comprises: a restoring module configured to restore, in response to the restore for the reusable test task sequence, the execution environment corresponding to the reusable test task sequence according to the backup. In general, since the time required for restoring the execution environment corresponding to the reusable test task sequence based on the backup is usually far less than the time for repeatedly executing the reusable test task sequence, execution time of the test cases can be significantly reduced, thereby improving efficiency of software testing.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention relates to a method and system for software testing. The method comprising: analyzing a plurality of test cases to obtain at least one reusable test task sequence between at least two test cases, the reusable test task sequence including at least one identical test task; dividing the plurality of test cases into at least one test case group according to the reusable test task sequence, wherein a plurality of test cases in each of the test case groups has at least one reusable test task sequence; wherein, each of the test tasks has an execution script. The method further comprising: generating an execution script of the test case by using an execution script of the test task, the execution script of the test case including at least one of backup or restore for the reusable test task sequence. With the method and system for software testing according to exemplary embodiments, execution time of test cases can be significantly reduced, thereby improving efficiency of software testing.

Exemplary embodiments of the present invention also provides a system for performing software testing by using a plurality of test cases, wherein each of the test cases includes a plurality of test tasks, the system comprising: an analyzing module configured to analyze the plurality of test cases to obtain at least one reusable test task sequence between at least two test cases, the reusable test task sequence including at least one identical test task; a dividing module configured to divide the plurality of test cases into at least one test case group according to the reusable test task sequence, wherein a plurality of test cases in each of the test case groups has at least one reusable test task sequence;

wherein, each of the test tasks has an execution script, the system further comprising: a generating module configured to generate an execution script of the test case by using an execution script of the test task, the execution script of the test case including at least one of backup or restore for the reusable test task sequence.

With the method and system for software testing according to the exemplary embodiments, execution time of test cases can be significantly reduced, thereby improving efficiency of software testing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing software testing by using a plurality of test cases, wherein each of the test cases includes a plurality of test tasks, the method comprising:
    analyzing, by an analyzing hardware module, the plurality of test cases to obtain at least one reusable test task sequence between at least two test cases, the reusable test task sequence including at least one identical test task;
    dividing, by a dividing hardware module, the plurality of test cases into multiple test case groups according to the reusable test task sequence, wherein a plurality of test cases in each of the multiple test case groups has at least one reusable test task sequence; and
    generating, for each of the plurality of test cases of the multiple test case groups and by a generating hardware module, an execution script of each test case by using an execution script of a reusable test task, the execution script of each test case including at least one of backup or restore for the reusable test task sequence.

2. The method according to claim 1, further comprising:
    executing, by one or more processors, the test cases;
    backing up, by one or more processors, a reusable test task sequence; and
    in response to said backing up of the reusable test task sequence, backing up, by one or more processors, an execution environment that corresponds to the reusable test task sequence.

3. The method according to claim 2, further comprising:
    restoring, by one or more processors, the reusable test task sequence; and
    in response to restoring the reusable test task sequence, restoring, by one or more processors, the execution environment that corresponds to the reusable test task sequence according to said backing up of the reusable test task sequence.

4. The method according to claim 2, wherein said backing up the execution environment in response to the backing up for the reusable test task sequence further comprises:
    in response to the backing up for the reusable test task sequence, determining, by one or more processors, whether the backing up of the reusable test task sequence accelerates software testing; and
    in response to determining that the backing up of the reusable test task sequence accelerates software testing, backing up, by one or more processors, the execution environment corresponding to the reusable test task sequence.

5. The method according to claim 4, wherein said determining whether the backing up of the reusable test task sequence accelerates software testing is made according to time for performing the backup and restore and execution time of the reusable test task sequence.

6. A system for performing software testing by using a plurality of test cases, wherein each of the test cases includes a plurality of test tasks, the system comprising:
    an analyzing hardware module configured to analyze the plurality of test cases to obtain at least one reusable test task sequence between at least two test cases, the reusable test task sequence including at least one identical test task;
    a dividing hardware module configured to divide the plurality of test cases into multiple test case groups according to the reusable test task sequence, wherein the plurality of test cases in each of the multiple test case groups has at least one reusable test task sequence; and
    a generating hardware module configured to generate, for each of the plurality of test cases of the multiple test case groups, an execution script of each test case by using an execution script of a reusable test task, the execution script of each test case including at least one of backup or restore for the reusable test task sequence.

7. The system according to claim 6, further comprising:
    an executing hardware module configured to execute the test cases; and
    a backup hardware module configured for backing up a reusable test task sequence, and in response to said backing up of the reusable test task sequence, backing up an execution environment that corresponds to the reusable test task sequence.

8. The system according to claim 7, further comprising:
    a restoring hardware module configured to restore the reusable test task sequence, and in response to restoring the reusable test task sequence, restoring the execution environment that corresponds to the reusable test task sequence according to said backing up of the reusable test task sequence.

9. The system according to claim 7, wherein the backup hardware module is further configured to:
    in response to the backing up for the reusable test task sequence, determine whether backing up the reusable test task sequence accelerates software testing; and
    in response to determining that backing up the reusable test task sequence accelerates software testing, back up the execution environment corresponding to the reusable test task sequence.

10. The system according to claim 9, wherein said determining whether backing up the reusable test task sequence accelerates software testing is made according to time for performing the backup and restore and execution time of the reusable test task sequence.

11. A computer program product for performing software testing by using a plurality of test cases, wherein each of the test cases includes a plurality of test tasks, the computer program product comprising a non-transitory computer readable storage medium having program code embodied therewith, and wherein the program code is readable and executable by a processor to perform a method comprising:

analyzing the plurality of test cases to obtain at least one reusable test task sequence between at least two test cases, the reusable test task sequence including at least one identical test task;

dividing the plurality of test cases into multiple test case groups according to the reusable test task sequence, wherein a plurality of test cases in each of the multiple test case groups has at least one reusable test task sequence; and generating, for each of the plurality of test cases of the multiple test case groups, an execution script of each test case by using an execution script of a reusable test task, the execution script of each test case including at least one of backup or restore for the reusable test task sequence.

12. The computer program product of claim 11, wherein the method further comprises:

executing the test cases;

backing up a reusable test task sequence; and in response to said backing up of the reusable test task sequence, backing up an execution environment that corresponds to the reusable test task sequence.

13. The computer program product of claim 12, wherein the method further comprises:

restoring the reusable test task sequence; and in response to restoring the reusable test task sequence, restoring the execution environment that corresponds to the reusable test task sequence according to said backing up of the reusable test task sequence.

14. The computer program product of claim 12, wherein said backing up the execution environment in response to the backing up for the reusable test task sequence further comprises:

in response to the backing up for the reusable test task sequence, determining whether backing up the reusable test task sequence accelerates software testing; and in response to determining that backing up the reusable test task sequence accelerates software testing, backing up the execution environment corresponding to the reusable test task sequence.

15. The computer program product of claim 14, wherein said determining whether backing up the reusable test task sequence accelerates software testing is made according to time for performing the backup and restore and execution time of the reusable test task sequence.

* * * * *